(12) United States Patent
Nunes et al.

(10) Patent No.: US 6,616,955 B2
(45) Date of Patent: Sep. 9, 2003

(54) BEVERAGE COMPOSITIONS COMPRISING PALATABLE CALCIUM AND MAGNESIUM SOURCES

(75) Inventors: Raul Victorino Nunes, Loveland, OH (US); Eric Gregory Elliott, Cincinnati, OH (US); Lisa Marie Trout, West Chester, OH (US); Mark Benson Andon, Fairfield, OH (US)

(73) Assignee: The Proctor & Gamble Co., Cincinnati, OH (US)

( * ) Notice: Subject to any disclaimer, the term of this patent is extended or adjusted under 35 U.S.C. 154(b) by 0 days.

(21) Appl. No.: 09/754,626

(22) Filed: Jan. 4, 2001

(65) Prior Publication Data

US 2002/0122847 A1 Sep. 5, 2002

(51) Int. Cl.[7] ............................. A23L 2/00; A23L 1/304
(52) U.S. Cl. ........................... 426/74; 426/590; 426/72; 426/73; 424/439
(58) Field of Search ....................... 426/72–74, 590; 424/439

(56) References Cited

U.S. PATENT DOCUMENTS

| | | | |
|---|---|---|---|
| 3,958,017 A | | 5/1976 | Morse et al. |
| 4,002,770 A | | 1/1977 | Wankier |
| 4,268,529 A | | 5/1981 | Davis, et al. |
| 4,551,342 A | * | 11/1985 | Nakel et al. ................. 426/548 |
| 4,710,387 A | | 12/1987 | Uiterwaal et al. |
| 4,737,367 A | | 4/1988 | Langer et al. |
| 4,758,439 A | | 7/1988 | Godfrey |
| 5,002,779 A | | 3/1991 | Mehansho et al. |
| 5,032,411 A | * | 7/1991 | Stray-Gundersen ......... 426/590 |
| 5,118,510 A | * | 6/1992 | Kuhrts ........................ 424/441 |
| 5,149,552 A | | 9/1992 | Vidal et al. |
| 5,151,274 A | | 9/1992 | Saltman et al. |
| 5,186,965 A | | 2/1993 | Fox et al. |
| 5,208,372 A | | 5/1993 | Vidal et al. |
| 5,294,606 A | * | 3/1994 | Hastings .................... 424/600 |
| 5,397,786 A | | 3/1995 | Simone |
| 5,468,506 A | | 11/1995 | Andon |
| 5,597,595 A | | 1/1997 | DeWille et al. |
| 5,609,897 A | | 3/1997 | Chandler et al. |
| 5,817,351 A | | 10/1998 | DeWille et al. |
| 5,888,563 A | | 3/1999 | Mehansho et al. |
| 5,928,691 A | | 7/1999 | Reddy et al. |
| 5,985,339 A | | 11/1999 | Kamarei |
| 6,030,650 A | | 2/2000 | Kamarei |
| 6,036,985 A | | 3/2000 | Jacobsen et al. |
| 6,051,261 A | | 4/2000 | Bartholmey et al. |
| 6,171,622 B1 | | 1/2001 | Someya et al. |
| 6,235,322 B1 | * | 5/2001 | Lederman .................... 426/443 |
| 6,261,610 B1 | * | 7/2001 | Sher et al. .................. 426/573 |

FOREIGN PATENT DOCUMENTS

| | | |
|---|---|---|
| CA | 2256133 A1 | 6/1999 |
| DE | 200 06 421 U1 | 6/2000 |
| EP | 0 205 634 A1 | 6/1985 |
| EP | 0 343 703 A2 | 11/1989 |
| EP | 0 571 653 B1 | 5/1992 |
| EP | 0 587 972 A1 | 3/1994 |
| EP | 0 951 844 A2 | 4/1998 |
| GB | 2 299 992 A | 10/1996 |
| JP | 4-27369 B2 | 4/1998 |
| WO | WO 94/05159 A2 | 9/1992 |
| WO | WO94/06412 * | 3/1994 |
| WO | WO 94/06412 A1 | 3/1994 |
| WO | WO 97/15201 A1 | 5/1997 |
| WO | WO 97/21356 | 6/1997 |
| WO | WO 95/07617 A1 | 9/1998 |

* cited by examiner

*Primary Examiner*—Carolyn Paden
(74) *Attorney, Agent, or Firm*—S. Robert Chuey; Carl J. Roof

(57) ABSTRACT

The present invention describes compositions comprising a calcium source and a magnesium source. The compositions are surprisingly palatable when delivered in a fruit juice beverage matrix at amounts which are nutritionally meaningful. In particular, the present invention relates to beverage compositions comprising: (a) a calcium source comprising a form selected from calcium carbonate, solubilized species thereof, and mixtures thereof; (b) at least about 20 milligrams of a magnesium source per reference serving of the composition; wherein the compositions are substantially free of milk base solids. In an another embodiment of the present invention, beverage compositions are described, comprising: (a) at least about 50 milligrams of a calcium source per reference serving of the composition; (b) at least about 20 milligrams of a magnesium source per reference serving of the composition, wherein the magnesium source comprises a form selected from magnesium carbonate, magnesium oxide, magnesium citrate, solubilized species thereof, and mixtures thereof; wherein the compositions are substantially free of milk base solids.

13 Claims, No Drawings

BEVERAGE COMPOSITIONS COMPRISING PALATABLE CALCIUM AND MAGNESIUM SOURCES

FIELD OF THE INVENTION

The present invention is directed to beverage compositions comprising a calcium and magnesium source. The beverage compositions are readily incorporated into a daily diet of foods and beverages, and are palatable to the consumer.

BACKGROUND OF THE INVENTION

Various nutritional products are available in the marketplace, containing numerous vitamins, minerals, or other nutritionals, all of which provide the mammalian system with the essential nutrients for sustaining life and maintaining health. For example, vitamin/mineral supplements, available in tablet or pill form, are particularly prevalent. However, such supplements can be undesirable for various reasons. For example, compliance with a supplement regimen is often compromised, since these supplements are not consistently incorporated into the mammalian diet. Additionally, supplements are often difficult or undesirable to ingest, due to their size, flavor, and/or odor.

Therefore, among other reasons, it is most desirable to incorporate nutritional supplementation within the daily diet of the mammal, i e., within the food and beverage products the mammal regularly consumes. Delivering such supplemented food and beverage products has, in many cases, been an arduous task. This is primarily related to the undesirable flavor profile of the vitamin or mineral used to supplement the product, often compounded by the undesirable color or physical/chemical instability of the vitamin or mineral. and Slimfast® are advertised to promote nutritional health through the delivery of a convenient, highly nutritional product. In products containing milk base solids, such as milks and shakes, efficient flavor masking by the milk base solids allows extensive supplementation of the product. That is, the undesirable flavor of the vitamin or mineral is effectively masked due to the heavy flavor or other character of the delivery vehicle. In such cases, providing vitamin or mineral supplements having an optimized flavor profile may not be important.

However, it is unacceptable to heavily supplement only products having a milk-based character. Many mammals are intolerant to such milk-based products and are therefore precluded from ingesting such products altogether. Other mammals find such products unacceptable for various reasons, including the presence of milk base solids and/or the consistency of the product. Additionally, certain age groups tend to enjoy milk-based products more than others (for example, adult humans versus young children). It is therefore important to provide other types of beverage products which provide necessary nutritional supplementation but are devoid of the foregoing problems.

Fruit juices and bottled waters (flavored or unflavored) are beverage vehicles which are widely accepted by consumers. Such beverages tend to be refreshing, as well as light in flavor. Recently, fruit juice beverage manufacturers have recognized the benefits to supplementing fruit juice products with calcium, for example, 100% orange juice supplemented with calcium to deliver milk-level calcium (i.e., approximately 30% USRDI of calcium). Various calcium sources have been utilized with varying degrees of success in terms of flavor impact and bioavailability. However, further supplementation of fruit juice beverages, i.e., beyond calcium and common vitamins such as vitamins A and C, has not been widely explored. Additionally, bottled waters have been minimally supplemented due to their absence, or minimization, of flavor. A primary reason is likely related to the difficulty of increasing supplementation, particularly with undesirable tasting minerals, in these lightly flavored products such as fruit juices.

Additionally, certain minerals such as magnesium must be delivered in relatively high amounts in order that the supplementation is nutritionally meaningful (ie., at least about 5% of a recommended daily intake). For example, the current U.S. Recommended Daily Intake of magnesium, which is important for building strong bones, is 400 milligrams daily. Therefore, the difficulty of supplementing a fruit juice or water product with a mineral such as magnesium is further increased, since the undesirable flavor is augmented by the necessarily high level of the mineral present in the product.

Surprisingly, the present inventors have discovered unique combinations of calcium and magnesium sources which, when incorporated into a beverage matrix which is substantially free of milk base solids, are quite palatable. These combinations allow the supplementation of calcium and magnesium at high levels, including levels below, at, or exceeding recommended daily intakes. Thus, the present invention overcomes the deficiencies of known products and provides vehicles for extensive supplementation of beverage products. These and other benefits of the present invention are described herein.

SUMMARY OF THE INVENTION

The present invention is directed to compositions comprising a calcium source and a magnesium source. The inventors have discovered unique combinations of these sources which, when delivered in a fruit juice beverage matrix at amounts which are nutritionally meaningful, are surprisingly palatable. Accordingly, the present inventors have discovered compositions which deliver nutritionally meaningful levels of calcium and magnesium, without compromising palatability.

In particular, the present invention relates to beverage compositions comprising:
 (a) a calcium source comprising a form selected from the group consisting of calcium carbonate, solubilized species thereof, and mixtures thereof;
 (b) at least about 20 milligrams of a magnesium source per reference serving of the composition;
wherein the compositions are substantially free of milk base solids.

In an another embodiment of the present invention, beverage compositions are described, comprising:
 (a) at least about 50 milligrams of a calcium source per reference serving of the composition;
 (b) at least about 20 milligrams of a magnesium source per reference serving of the composition, wherein the magnesium source comprises a form selected from the group consisting of magnesium carbonate, magnesium oxide, magnesium citrate, solubilized species thereof, and mixtures thereof;
wherein the compositions are substantially free of milk base solids.

DETAILED DESCRIPTION OF THE INVENTION

Publications and patents are referred to throughout this disclosure. All references cited herein are hereby incorporated by reference.

All percentages and ratios are calculated by weight unless otherwise indicated. All percentages and ratios are calculated based on the total composition unless otherwise indicated.

All component or composition levels are in reference to the active level of that component or composition, and are exclusive of impurities, for example, residual solvents or by-products, which may be present in commercially available sources.

Referred to herein are trade names for components including various ingredients utilized in the present invention. The inventors herein do not intend to be limited by materials under a certain trade name. Equivalent materials (e.g., those obtained from a different source under a different name or catalog number) to those referenced by trade name may be substituted and utilized in the compositions, kits, and methods herein.

In the description of the invention various embodiments and/or individual features are disclosed. As will be apparent to the ordinarily skilled practitioner, all combinations of such embodiments and features are possible and can result in preferred executions of the present invention.

The compositions, kits, and methods herein may comprise, consist essentially of, or consist of any of the elements as described herein.

As used herein, the term "milk base solids" means the solids content (i.e., dry matter) of milk base.

As used herein, the term "milk base" means milk from one or more mammals or a plant-derived milk, including, for example, fermented milk, lactic acid beverages obtained by lactic acid fermentation or otherwise acidified, sterilized milk base, liquid milk, and milk products such as skim milk powder or whole milk powder or other powdered forms of milk.

As used herein, the term "substantially free of milk base solids", in reference to the present compositions, means that the composition comprises less than about 0.1% milk base solids, preferably less than about 0.05% milk base solids, even more preferably less than about 0.01% milk solids, and most preferably less than about 0.005% milk base solids, all by weight of the composition.

As used herein, the term "per reference serving of the composition" refers to the amount of relevant component per every 250 milliliters of the full-strength beverage composition. For example, wherein a composition comprises at least about 20 milligrams of the calcium source per reference serving of the composition, 2000 milliliters of the bulk, ready-to-drink beverage composition would comprise at least about 160 milligrams of the calcium source. As another example, wherein a composition comprises at least about 20 milligrams of the calcium source per reference serving of the composition, a powdered beverage composition providing 10 reference servings of full-strength beverage composition upon dilution with water or another liquid would comprise at least about 200 milligrams of the calcium source.

As used herein, the term "full-strength", with reference to the composition, means a composition of the present invention which has been diluted with water and/or another liquid such that the composition is in drinkable form. Accordingly, ready-to-drink beverage compositions (which are not directed for further dilution) are full-strength beverage compositions; beverage concentrates and dry beverage compositions require dilution with water and/or another liquid to provide the full-strength composition.

COMPOSITIONS OF THE PRESENT INVENTION

The present invention is directed to compositions comprising a calcium source and a magnesium source. The inventors have discovered unique combinations of these sources which, when delivered in a fruit juice beverage matrix at amounts which are nutritionally meaningful, are surprisingly palatable.

The compositions are suitable for mammalian use, particularly use in humans and domestic animals such as, for example, dogs and cats. The present invention is further directed to kits comprising such compositions and methods of using such compositions.

In one embodiment of the present invention, beverage compositions are described, comprising:
 (a) a calcium source comprising a form selected from the group consisting of calcium carbonate, solubilized species thereof, and mixtures thereof;
 (b) at least about 20 milligrams of a magnesium source per reference serving of the composition;
wherein the compositions are substantially free of milk base solids.

In an another embodiment herein, the present invention relates to beverage compositions comprising:
 (a) at least about 50 milligrams of a calcium source per reference serving of the composition;
 (b) at least about 20 milligrams of a magnesium source per reference serving of the composition, wherein the magnesium source comprises a form selected from the group consisting of magnesium carbonate, magnesium oxide, magnesium citrate, solubilized species thereof, and mixtures thereof;
wherein the compositions are substantially free of milk base solids.

The calcium and magnesium sources utilized herein are defined as set forth below.

Calcium Source

In one embodiment of the present invention, the calcium source utilized herein is not limited as to form, due to the surprising finding that combination with a specific magnesium source (i.e., magnesium carbonate, magnesium oxide, magnesium citrate, solubilized species thereof, and mixtures thereof) results in a composition which is palatable, even at nutritionally meaningful levels of each source. Thus, unless otherwise specified herein, the calcium source is inclusive of any compound containing calcium, including a salt, complex, solubilized species, or other form of calcium, including elemental calcium. Acceptable forms of calcium are well-known in the art.

Preferred forms of calcium include, for example, amino acid chelated calcium, calcium carbonate, calcium oxide, calcium hydroxide, calcium sulfate, calcium chloride, calcium phosphate, calcium hydrogen phosphate, calcium dihydrogen phosphate, calcium citrate, calcium malate, calcium citrate malate, calcium gluconate, calcium tartrate, calcium lactate, solubilized species thereof, and mixtures thereof.

The form of calcium citrate malate is described in, e.g., Mehansho et al., U.S. Pat. No. 5,670,344, issued Sep. 23, 1997; Diehl et al., U.S. Pat. No. 5,612,026, issued Mar. 18, 1997; Andon et al., U.S. Pat. No. 5,571,441, issued Nov. 5, 1996; Meyer et al., U.S. Pat. No. 5,474,793, issued Dec. 12, 1995; Andon et al., U.S. Pat. No. 5,468,506, issued Nov. 21, 1995; Burkes et al., U.S. Pat. No. 5,445,837, issued Aug. 29, 1995; Dake et al., U.S. Pat. No. 5,424,082, issued Jun. 13, 1995; Burkes et al., U.S. Pat. No. 5,422,128, issued Jun. 6, 1995; Burkes et al., U.S. Pat. No. 5,401,524, issued Mar. 28, 1995; Zuniga et al., U.S. Pat. No. 5,389,387, issued Feb. 14, 1995; Jacobs, U.S. Pat. No. 5,314,919, issued May 24, 1994; Saltman et al., U.S. Pat. No. 5,232,709, issued Aug. 3, 1993; Camden et al., U.S. Pat. No. 5,225,221, issued Jul. 6, 1993; Fox et al., U.S. Pat. No. 5,215,769, issued Jun. 1, 1993; Fox et al., U.S. Pat. No. 5,186,965, issued Feb. 16, 1993; Saltman et al., U.S. Pat. No. 5,151,274, issued Sep. 29, 1992; Kochanowski, U.S. Pat. No. 5,128,374, issued Jul. 7, 1992; Mehansho et al., U.S. Pat. No. 5,118,513, issued Jun. 2, 1992; Andon et al., U.S. Pat. No. 5,108,761, issued Apr. 28, 1992; Mehansho et al., U.S. Pat. No. 4,994,283, issued Feb. 19, 1991; Nakel et al., U.S. Pat. No. 4,786,510, issued Nov. 22, 1988; and Nakel et al., U.S. Pat. No. 4,737,375, issued Apr. 12, 1988. Calcium citrate malate may be added directly when forming a beverage composition or, preferably, be present in the composition as a solubilized species of a calcium form.

As used herein, the term "solubilized species thereof", in reference to a group of calcium forms or a specific calcium form, means those species which exist in the composition by virtue of addition of the referenced calcium form during the process of creating the composition, followed by reaction of the referenced calcium form with one or more other components also added during the process of making the composition. Thus, for example, when creating a composition of the present invention, calcium carbonate may be added during the process of creating the composition. In this example, wherein citric and/or malic acid is also added during the process of making the composition, the calcium carbonate may react to create calcium citrate malate (which is solubilized in solution to provide calcium, citrate, and malate species). Thus, in this example, calcium citrate malate is a "solubilized species thereof" of calcium carbonate. In this example, it is important to understand that, within the definitions of the present invention, the same calcium citrate malate is not a "solubilized species thereof" of, for example, calcium hydroxide, since (in this example) it was calcium carbonate rather than calcium hydroxide which was added during the process of creating the composition (even though calcium citrate malate may be alternatively formed by introducing calcium hydroxide to citric and malic acids in solution). This is an important distinction in accordance with the present invention, since the inventors have discovered that, wherein a solubilized species is present within the composition, the flavor profile of the composition may be dependent upon the specific calcium form through which the solubilized species is created.

The solubilized species of any given calcium form are formed in situ, typically by introducing an edible acid during the making process. Preferably, the edible acid is selected from lactic acid, citric acid, malic acid, fumaric acid, adipic acid, phosphoric acid, gluconic acid, tartaric acid, ascorbic acid, acetic acid, phosphoric acid, succinic acid, and mixtures thereof. More preferably, the edible acid is selected from citric acid, malic acid, tartartic acid, fumaric acid, succinic acid, and mixtures thereof. Even more preferably, the edible acid is selected from citric acid, malic acid, and mixtures thereof. Most preferably, the edible acid is a mixture of citric acid and malic acid. Thus, for example, wherein the solubilized species is calcium citrate malate, the edible acid is a mixture of citric acid and malic acid.

In a particularly preferred embodiment of the present invention, the composition comprises a calcium source comprising a form selected from calcium carbonate, solubilized species thereof, and mixtures thereof. It has been surprisingly discovered that calcium carbonate, and the solubilized species of calcium carbonate (ie., as described above, those species which exist upon addition of calcium carbonate during the process of making the composition), provide an optimal flavor profile, particularly at nutritionally meaningful levels of the calcium source (e.g., at least about 5% of the U.S. recommended daily intake of calcium). Preferred solubilized species of calcium carbonate include those formed by introduction of an edible acid, as described above. Highly preferred solubilized species of calcium carbonate include calcium citrate, calcium malate, and calcium citrate malate (all species of which are in solution, through the introduction of calcium carbonate with citric and/or malic acid). The most preferred solubilized species of calcium carbonate is calcium citrate malate. Mixtures of all of the foregoing are also contemplated herein. For example, wherein calcium carbonate is added during the making process, along with citric and malic acid, a fraction of the calcium carbonate may remain undissociated, thus providing a mixture of calcium carbonate and the solubilized species calcium citrate malate.

It is important to recognize that the present invention, by virtue of flavor optimization, allows inclusion of calcium and magnesium at nutritionally meaningful amounts. This is particularly important with respect to calcium, since the U.S. recommended daily intake of calcium is 1 gram (based on National Academy of Sciences' 1968 Recommended Dietary Allowances). Thus, in preferred embodiments of the present invention, the present compositions comprise at least about 50 milligrams of the calcium source per reference serving of the composition. Since it is important to the invention that even more significant levels of nutrient are provided, it is further preferred that the present composition comprise from about 100 milligrams to about 1100 milligrams, more preferably from about 150 milligrams to about 600 milligrams, even more preferably from about 200 milligrams to about 500 milligrams, and most preferably from about 240 milligrams to about 400 milligrams of the calcium source per reference serving of the composition. In a particularly preferred embodiment, from about 100 milligrams to about 330 milligrams, particularly from about 250 milligrams to about 330 milligrams, of the calcium source per reference serving of the composition is desired. From about 250 milligrams to about 330 milligrams is particularly preferred as this provides milk-level calcium in a typical serving of the composition. As used herein, all forms of calcium within the composition are combined together to provide the level of calcium source of the composition.

Magnesium Source

In one embodiment of the present invention, the magnesium source utilized herein is not limited as to form, due to the surprising finding that combination with a specific calcium source (i.e., calcium carbonate, solubilized species thereof, and mixtures thereof) results in a composition which is palatable, even at nutritionally meaningful levels of each source. Thus, unless otherwise specified herein, the magnesium source is inclusive of any compound containing magnesium, including a salt, complex, solubilized species, or other form of magnesium, including elemental magnesium. Acceptable forms of magnesium are well-known in the art.

Non-limiting examples of preferred magnesium sources including magnesium chloride, magnesium citrate, magnesium gluceptate, magnesium gluconate, magnesium hydroxide, magnesium lactate, magnesium carbonate, magnesium oxide, magnesium picolate, magnesium sulfate, solubilized species thereof, and mixtures thereof. Additionally, amino acid chelated and creatine chelated magnesium are highly preferred. Amino acid and creatine chelates of magnesium are well-known in the art, and are described in, for example, Pedersen et al, U.S. Pat. No. 5,516,925, assigned to Albion International, Inc., issued May 14, 1996; Ashmead, U.S. Pat. No. 5,292,729, assigned to Albion International, Inc., issued Mar, 8, 1994; and Ashmead, U.S. Pat. No. 4,830,716, assigned to Albion International, Inc., issued May 16, 1989. These chelates contain one or more natural amino acids selected from alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine or dipeptides, tripeptides or quadrapeptides formed by any combination of these amino acids.

As used herein, the term "solubilized species thereof", in reference to a group of magnesium forms or a specific magnesium form, means those species which exist in the composition by virtue of addition of the referenced magnesium form during the process of creating the composition, followed by introduction of the referenced magnesium form to one or more other components also added during the process of making the composition. Thus, for example, when creating a composition of the present invention, magnesium oxide may be added during the process of creating the composition. In this example, wherein citric and/or malic acid is also added during the process of making the composition, the magnesium oxide may react to create solubilized magnesium citrate malate (ie., magnesium, citrate, and malate species in solution). Thus, in this example, magnesium citrate malate is a "solubilized species thereof" of magnesium oxide. In this example, it is important to understand that, within the definitions of the present invention, the same magnesium citrate malate is not a "solubilized species thereof" of, for example, magnesium chloride, since (in this example) it was magnesium oxide rather than magnesium chloride which was added during the process of creating the composition (even though magnesium citrate malate may be alternatively formed by reacting magnesium chloride with citric and malic acids). This is an important distinction in accordance with the present invention, since the inventors have discovered that wherein a solubilized species is present within the composition, the flavor profile of the composition may be dependent upon the specific form through which the solubilized species is created.

The solubilized species of any given magnesium form are formed in situ, typically by introducing an edible acid during the making process. Preferably, the edible acid is selected from lactic acid, citric acid, malic acid, fumaric acid, adipic acid, phosphoric acid, gluconic acid, tartaric acid, ascorbic acid, acetic acid, phosphoric acid, succinic acid, and mixtures thereof. More preferably, the edible acid is selected from citric acid, malic acid, tartartic acid, fumaric acid, succinic acid, and mixtures thereof. Even more preferably, the edible acid is selected from citric acid, malic acid, and mixtures thereof. Most preferably, the edible acid is a mixture of citric acid and malic acid. Thus, for example, wherein the solubilized species is magnesium citrate malate, the edible acid is a mixture of citric acid and malic acid.

In a particularly preferred embodiment of the present invention, the composition comprises a magnesium source comprising a form selected from magnesium carbonate, magnesium oxide, solubilized species thereof, and mixtures thereof. Preferably, the magnesium source comprises a form selected from magnesium oxide, solubilized species thereof, and mixtures thereof. It has been surprisingly discovered that magnesium carbonate and magnesium oxide, as well as their respective solubilized species (i.e., as described above, those salts which form upon addition of magnesium carbonate or magnesium oxide during the process of making the composition), provide an optimal flavor profile, particularly at nutritionally meaningful levels of the magnesium source (e.g., at least about 5% of the U.S. recommended daily intake of magnesium). Preferred solubilized species of magnesium carbonate and magnesium oxide include those formed by the introduction of an edible acid, as described above. Preferred solubilized species of magnesium carbonate and magnesium oxide include magnesium citrate, magnesium malate, and magnesium citrate malate (all formed through the reaction of magnesium carbonate or magnesium oxide with citric and/or malic acid, to provide the solubilized species). The most preferred solubilized species of magnesium carbonate and magnesium oxide is magnesium citrate malate. Mixtures of all of the foregoing are also contemplated herein. For example, wherein magnesium oxide is added during the making process, along with citric and malic acid, a fraction of the magnesium oxide may remain undissociated, thus providing a mixture of magnesium oxide and magnesium citrate malate.

It is important to recognize that the present invention, by virtue of flavor optimization, allows inclusion of calcium and magnesium at nutritionally meaningful amounts. Like calcium, this is particularly important for magnesium, since the U.S. recommended daily intake of magnesium is 400 milligrams (based on National Academy of Sciences' 1968 Recommended Dietary Allowances). Thus, in preferred embodiments of the present invention, the present compositions comprise at least about 20 milligrams of the magnesium source per reference serving of the composition. Since it is important to the invention that even more significant levels of nutrient are provided, it is further preferred that the present composition comprise from about 40 milligrams to about 300 milligrams, more preferably from about 40 milligrams to about 250 milligrams, even more preferably from about 40 milligrams to about 150 milligrams, and most preferably from about 40 milligrams to about 130 milligrams per reference serving of the composition. In a particularly preferred embodiment, from about 40 milligrams to about 120 milligrams of the magnesium source per reference serving of the composition is desired, providing about 10% to about 30% of the U.S. Recommended Daily Intake of magnesium in a typical serving of the composition. As used herein, all forms of magnesium within the composition are combined together to provide the level of magnesium source of the composition.

Optional Components of the Present Compositions

As stated, the compositions of the present invention may be utilized as beverage compositions. Consistent with this use, the compositions of the present invention may comprise other optional components to enhance, for example, their performance in providing a desirable nutritional profile, and/or providing enhanced organoleptic properties. For example, one or more bracers, flavanols, non-caloric sweeteners, further nutrients, emulsions, thickeners, flavoring agents, coloring agents, preservatives, acidulants, water, carbonation components, and/or the like may be included in the compositions herein. Such optional components may be dispersed, solubilized, or otherwise mixed into the present compositions. These components may be added to the compositions herein, preferably if they do not substantially hinder the properties of the composition, particularly flavor profile of the composition. Non-limiting examples of optional components suitable for use herein are given below.

Bracers

As is commonly known in the art, bracers can be obtained by extraction from a natural source or can be synthetically produced. Non-limiting examples of bracers include methylxanthines, e.g., caffeine, theobromine, and theophylline. Additionally, numerous other xanthine derivatives have been isolated or synthesized, which may be utilized as a bracer in the compositions herein. See e.g., Bruns, Biochemical Pharmacology, Vol. 30, pp. 325–333 (1981) which describes, inter alia, xanthine, 9-methyl xanthine, 7-methyl xanthine, 3-methyl xanthine, 3,7-dimethyl xanthine, 8-chloromethyl-3,7-dimethyl xanthine, 8-hydroxymethyl-3,7-dimethyl xanthine, 3,7-diethyl xanthine, 3,7-bis-(2-hydroxyethyl) xanthine, 3-propyl-7-(dimethylaminoethyl) xanthine, 1-methyl xanthine, 1,9-dimethyl xanthine, 1-methyl-8-methylthio xanthine, 8-phenyl-1-methyl xanthine, 1,7-dimethyl xanthine, 1,7-dimethyl-8-oxo xanthine, 1,3-dimethyl xanthine, 1,3,9-trimethyl xanthine, 8-fluoro theophylline, 8-chloro theophylline, 8-bromo theophylline, 8-thio theophylline, 8-methylthio theophylline, 8-ethylthio theophylline, 8-nitro theophylline, 8-methylamino theophylline, 8-dimethylamino theophylline, 8-methyl theophylline, 8-ethyl theophylline, 8-propyl theophylline, 8-cyclopropyl theophylline, theophylline-8-propionate (ethyl ester), 8-benzyl theophylline, 8-cyclopentyl theophylline, 8-cyclohexyl theophylline, 8-(3-indolyl) theophylline, 8-phenyl theophylline, 9-methyl-8-phenyl theophylline, 8-(p-chlorophenyl) theophylline, 8-(p-bromophenyl) theophylline, 8-(p-methoxyphenyl) theophylline, 8-(p-nitrophenyl) theophylline, 8-(p-dimethylaminophenyl) theophylline, 8-(p-methylphenyl) theophylline, 8-(3,4-dichlorophenyl) theophylline, 8-(m-nitrophenyl) theophylline, 8-(o-nitrophenyl) theophylline, 8-(o-carboxyphenyl) theophylline, 8-(1-naphthyl) theophylline, 8-(2,6-dimethyl-4-hydroxyphenyl) theophylline, 7-methoxy-8-phenyl theophylline, 1,3,7-trimethyl xanthine, S-chloro caffeine, S-oxo caffeine, S-methoxy caffeine, S-methylamino caffeine, 8-diethylamino caffeine, 8-ethyl caffeine, 7-ethyl theophylline, 7-(2-chloroethyl) theophylline, 7-(2-hydroxyethyl) theophylline, 7-(carboxymethyl) theophylline, 7-(carboxymethyl) theophylline (ethyl ester), 7-(2-hydroxypropyl) theophylline, 7-(2,3-dihydroxypropyl) theophylline, 7-βD-ribofuranosyl theophylline, 7-(glycero-pent-2-enopyranosyl) theophylline, 7-phenyl theophylline, 7,8-diphenyl theophylline, 1-methyl-3,7-diethyl xanthine, 1-methyl-3-isobutyl xanthine, I-ethyl-3,7-dimethyl xanthine, 1,3-diethyl xanthine, 1,3,7-triethyl xanthine, 1-ethyl-3-propyl-7-butyl-8-methyl xanthine, 1,3-dipropyl xanthine, 1,3-diallyl xanthine, 1-butyl-3,7-dimethyl xanthine, 1-hexyl-3,7-dimethyl xanthine, and 1-(5-oxohexyl)-3,7-dimethyl xanthine.

Additionally, one or more of these bracers are present in, for example, coffee, tea, kola nut, cacao pod, mate, yaupon, guarana paste, and yoco. Natural plant extracts are the preferred sources of bracers as they may contain other compounds that delay the bioavailability of the bracer.

The most preferred methylxanthine is caffeine. Caffeine may be obtained from the aforementioned plants or, alternatively, may be synthetically prepared. Preferred botanical sources of caffeine which may be utilized as a complete or partial source of caffeine include green tea, guarana, mate, black tea, cola nuts, cocoa, and coffee. As used herein, green tea, guarana, coffee, and mate are the most preferred botanical sources of caffeine, most preferably green tea, guarana, and coffee. Mate may have the additional benefit of an appetite suppressing effect and may be included for this purpose as well.

Any bracer utilized herein is preferably present in physiologically relevant amounts, which means that the sources used in the practice of this invention provide a safe and effective quantity. Wherein a bracer is utilized in the present compositions, such compositions will preferably comprise from about 0.0005% to about 1%, more preferably from about 0.003% to about 0.5%, still more preferably from about 0.003% to about 0.2%, even more preferably from about 0.005% to about 0.05%, and most preferably from about 0.005% to about 0.02% of a bracer, by weight of the composition. Of course, as the skilled artisan will comprehend, the actual amount of bracer added will depend its biological effect, for example, effect of mental alertness on the consumer.

Flavanols

Flavanols are natural substances present in a variety of plants (e.g., fruits, vegetables, and flowers). The flavanols which may be utilized in the present invention can be extracted from, for example, fruit, vegetables, green tea or other natural sources by any suitable method well known to those skilled in the art. For example, extraction with ethyl acetate or chlorinated organic solvents is a common method to isolate flavanols from green tea. Flavanols may be extracted from either a single plant or mixtures of plants. Many fruits, vegetables, and flowers contain flavanols but to a lesser degree relative to green tea. Plants containing flavanols are known to those skilled in the art. Examples of the most common flavanols which are extracted from tea plants and other members of the *Catechu gambir* (Uncaria family) include, for example, catechin, epicatechin, gallocatechin, epigallocatechin, epicatechin gallate, and epigallocatechin gallate.

The flavanols utilized in all compositions of the present invention can be in the form of a tea extract. The tea extract can be obtained from the extraction of unfermented teas, fermented teas, partially fermented teas, and mixtures thereof. Preferably, the tea extracts are obtained from the extraction of unfermented and partially fermented teas. The most preferred tea extracts are obtained from green tea. Both hot and cold extracts can be used in the present invention. Suitable methods for obtaining tea extracts are well known. See e.g., Ekanayake, U.S. Pat. No. 5,879,733, issued Mar. 9, 1999; Tsai, U.S. Pat. No. 4,935,256, issued June, 1990; Lunder, U.S. 4,680,193, issued July, 1987; and Creswick, U.S. Pat. No. 4,668,525, issued May 26, 1987.

The preferred source of flavanols in the compositions of the present invention is green tea. Wherein green tea, and in particular the flavanols present in green tea, are incorporated into the beverage, the present inventors have discovered that the flavanols are at least partially responsible for delaying the bioavailability of bracers, which contributes to the reduction and/or elimination of nervousness and tension typically associated with such bracers.

Alternatively, these same flavanols may be prepared by synthetic or other appropriate chemical methods and incorporated into the present compositions. Flavanols, including catechin, epicatechin, and their derivatives are commercially available.

The amount of flavanols in the compositions of the present invention can vary. However, wherein one or more flavanols are utilized, preferably from about 0.001% to about 5%, more preferably from about 0.001% to about 2%, even more preferably from about 0.01% to about 1%, and most preferably from about 0.01% to about 0.05% of one or more flavanols is utilized, by weight of the composition.

Sweeteners

The compositions of the present invention can, and typically will, contain an effective amount of one or more sweeteners, including carbohydrate sweeteners and natural and/or artificial no/low calorie sweeteners. The amount of the sweetener used in the beverages of the present invention typically depends upon the particular sweetener used and the sweetness intensity desired. For no/low calorie sweeteners, this amount varies depending upon the sweetness intensity of the particular sweetener.

The compositions of the present invention can be sweetened with any of the carbohydrate sweeteners, preferably monosaccharides and/or disaccharides. Sweetened beverages will typically comprise from about 0.1% to about 20%, most preferably from about 6 to about 14%, sweetener. These sugars can be incorporated into the beverages in solid or liquid form but are typically, and preferably, incorporated as a syrup, most preferably as a concentrated syrup such as high fructose corn syrup. For purposes of preparing beverages of the present invention, these sugar sweeteners can be provided to some extent by other components of the beverage such as, for example, the fruit juice component and/or flavors.

Preferred sugar sweeteners for use in beverage products of the present invention are sucrose, fructose, glucose, and mixtures thereof, particularly sucrose and fructose. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein, as fructose. Other naturally occurring sweeteners or their purified extracts, such as glycyrrhizin, stevioside, the protein sweetener thaumatin, the juice of Luo Han Guo (containing the sweet mogrosides) disclosed in, for example, Fischer et al., U. S. Pat. No. 5,433,965, issued Jul. 18, 1995, and the like can also be used in the beverages of the present invention.

Effective levels of non-caloric sweeteners may optionally be used in the compositions of the present invention to further sweeten such compositions. Non-limiting examples of non-caloric sweeteners include aspartame, saccharine, cyclamates, acesulfame K, L-aspartyl-L-phenylalanine lower alkyl ester sweeteners, L-aspartyl-D-alanine amides such as, for example, those disclosed in Brennan et al., U.S. Pat. No. 4,411,925, issued 1983, L-aspartyl-D-serine amides such as, for example, those disclosed in Brennan et al., U.S. Pat. No. 4,399,163, issued 1983, L-aspartyl-hydroxymethyl alkane amide sweeteners such as, for example, those disclosed in Brand, U.S. Pat. No. 4,338,346, issued 1982, L-aspartyl-1-hydroxyethylalkane amide sweeteners such as, for example, those disclosed in Rizzi, U.S. Pat. No. 4,423,029, issued 1983, glycyrrhizins, and synthetic alkoxy aromatics. Aspartame and acesulfame-K are the most preferred non-caloric sweeteners utilized herein, and may be utilized alone or in combination.

Wherein one or more sweeteners are utilized herein, the total non-caloric sweetener is preferably utilized at levels from about 0.0001% to about 5%, more preferably from about 0.001% to about 3%, still more preferably from about 0.005% to about 2%, even more preferably from about 0.01% to about 1%, and most preferably from about 0.01% to about 0.05%, by weight of the composition.

Nutrients

As previously stated, the present compositions comprise a calcium source and a magnesium source. The compositions herein may optionally, but preferably, be fortified further with one or more other nutrients, especially one or more vitamins and/or minerals. Wherein such vitamins and/or minerals are included, it is preferable that care is utilized such that the palatable flavor provided through use of the calcium and magnesium sources herein is not significantly diminished.

Unless otherwise specified herein, wherein a given vitamin is present in the composition, the composition comprises at least about 1%, preferably at least about 2%, more preferably from about 2% to about 200%, even more preferably from about 5% to about 150%, and most preferably from about 10% to about 120% of the USRDI of such vitamin. The United States Recommended Daily Intake (USRDI) for vitamins and minerals is defined and set forth in the Recommended Daily Dietary Allowance-Food and Nutrition Board, National Academy of Sciences-National Research Council.

Non-limiting examples of vitamins include vitamin A, one or more B-complex vitamins (which include one or more of thiamin (also commonly referred to as "vitamin $B_1$"), riboflavin (also commonly referred to as "vitamin $B_2$"), niacin (also commonly referred to as "vitamin $B_3$"), pantothenic acid (also commonly referred to as "vitamin $B_5$"), pyridoxine (also commonly referred to as "vitamin B6"), biotin, folic acid (also commonly referred to as folate), and the cobalam ins (also commonly referred to as "vitamin $B_{12}$")), vitamin C, vitamin D, and vitamin E. Preferably, wherein a vitamin is utilized the vitamin or mineral is selected from vitamin A, niacin, thiamin, folic acid, pyroxidine, cobalamin, vitamin C, vitamin E, and vitamin D. Preferably, at least one vitamin is selected from vitamin A, pyroxidine, cobalamin, vitamin C, and vitamin E.

As used herein, "vitamin A" is inclusive of one or more nutritionally active unsaturated hydrocarbons, including the retinoids (a class of compounds including retinol and its chemical derivatives having four isoprenoid units) and the carotenoids.

Common retinoids include retinol, retinal, retinoic acid, retinyl palmitate, and retinyl acetate.

In a preferred embodiment herein, the vitamin A is a carotenoid. Common carotenoids include beta-carotene, alpha-carotene, beta-apo-8'-carotenal, cryptoxanthin, canthaxanthin, astacene, and lycopene. Among these, beta-carotene is the most preferred for use herein.

The vitamin A may be in any form, for example, an oil, beadlets, or encapsulated. See e.g., Cox et al., U.S. Pat. No. 6,007,856, assigned to The Procter & Gamble Co., issued Dec. 28, 1999. Vitamin A is often available as an oil dispersion, ie., small particles suspended in oil.

As used herein, the USRDI for vitamin A is 5000 International Units (IU). Wherein vitamin A is present in the compositions herein, the composition typically comprises, per reference serving of the composition, at least about 1%, preferably at least about 5%, more preferably from about 10% to about 100%, even more preferably from about 10% to about 50%, and most preferably from about 10% to about 30% of the USRDI of such vitamin. The ordinarily skilled artisan will understand that the quantity of vitamin A to be added is dependent on processing conditions and the amount of vitamin A delivery desired after storage (dependent on, for example, time, temperature, and type of packaging material utilized).

As stated the vitamin used herein may be a B-complex vitamin. As used herein, the B-complex vitamins include one or more of thiamin (also commonly referred to as "vitamin $B_1$"), riboflavin (also commonly referred to as "vitamin $B_2$"), niacin (also commonly referred to as "vitamin $B_3$"), pantothenic acid (also commonly referred to as "vitamin $B_5$"), pyridoxine (also commonly referred to as "vitamin $B_6$"), biotin, folic acid (also commonly referred to as folate), and the cobalamins (also commonly referred to as "vitamin $B_{12}$"). Among these, inclusion of vitamin $B_6$ and/or $B_{12}$ are particularly preferred.

As used herein: the USRDI for thiamin is 1.5 milligrams; the USRDI for riboflavin is 1.7 milligrams; the USRDI for niacin is 20 milligrams; the USRDI for pyridoxine is 2 milligrams; the USRDI for the cobalamins is 6 micrograms; the USRDI for folic acid is 0.4 milligrams; the USRDI for pantothenic acid is 10 milligrams; and the USRDI for biotin is 0.3 milligrams. Wherein a B-complex vitamin is present in the compositions herein, the composition typically comprises at least about 1%, preferably at least about 5%, more preferably from about 10% to about 200%, even more preferably from about 15% to about 150%, and most preferably from about 20% to about 120% of the USRDI of each B-complex vitamin present in the composition, per reference serving of the composition. Wherein a B-complex vitamin is present in the compositions herein, it is especially preferred to include from about 10% to about 50% of the USRDI of each B-complex vitamin present in the composition, per reference serving of the composition. The ordinarily skilled artisan will understand that the quantity of B-complex vitamin to be added is dependent on processing conditions and the amount of B-complex vitamin delivery desired after storage (dependent on, for example, time, temperature, and type of packaging material utilized).

As used herein, "vitamin C" is inclusive of one or more of L-ascorbic acid (also referred to herein as ascorbic acid), as well as their bioequivalent forms including salts and esters thereof. For example, the sodium salt of ascorbic acid is considered vitamin C herein. Additionally, there are many widely known esters of vitamin C, including ascorbyl acetate. Fatty acid esters of vitamin C are lipid soluble and can provide an antioxidative effect.

The vitamin C utilized may be in any form, for example, free or in encapsulated form. It is highly preferred herein to utilize free vitamin C, for example, as ascorbic acid.

As used herein, the USRDI of vitamin C is about 60 milligrams. Wherein vitamin C is present in the compositions herein, the compositions typically comprise at least about 6 milligrams per reference serving of the composition, more preferably at least about 12 milligrams, still more preferably at least about 30 milligrams, even more preferably from about 40 milligrams to about 200 milligrams, and most preferably from about 48 to about 170 milligrams of vitamin C, per reference serving of the composition. The ordinarily skilled artisan will understand that the quantity of vitamin C to be added is dependent on processing conditions and the amount of vitamin C delivery desired after storage. Thus, it is not uncommon to utilize twice the desired amount (ie., the labeled amount) of vitamin C during manufacture in the product.

As used herein, "vitamin E" is inclusive of one or more tocols or tocotrienols which exhibit vitamin activity similar to that of alpha-tocopherol (which, as used herein, is considered a tocol) as well as their bioequivalent forms including salts and esters thereof. Vitamin E is typically found in oils including, for example, sunflower, peanut, soybean, cottonseed, corn, olive, and palm oils.

Non-limiting examples of vitamin E include alpha-tocopherol, beta-tocopherol, gamma-tocopherol, and delta-tocopherol, as well as esters thereof (e.g., alpha-tocopherol acetate). Alpha-tocopherol and particularly alpha-tocopherol acetate are highly preferred for use as vitamin E herein.

The vitamin E utilized may be in any form, for example, free or in encapsulated form.

As used herein, the USRDI for vitamin E is 30 International Units (IU). Wherein vitamin E is present in the compositions herein, the composition typically comprises at least about 1%, preferably at least about 2%, more preferably from about 5% to about 100%, even more preferably from about 5% to about 50%, and most preferably from about 15% to about 35% of the USRDI of such vitamin, per reference serving of the composition. Wherein vitamin E is present in the compositions herein, it is especially preferred to include from about 20% to about 25% of the USRDI of vitamin E, per reference serving of the composition. The ordinarily skilled artisan will understand that the quantity of vitamin E to be added is dependent on processing conditions and the amount of vitamin E delivery desired after storage.

Wherein a given additional mineral (i.e., one additional to the calcium and magnesium) is present in the composition, the composition typically comprises at least about 1%, preferably at least about 2%, more preferably from about 5% to about 100%, even more preferably from about 5% to about 40%, and most preferably from about 5% to about 30% of the USRDI of such mineral.

Minerals other than calcium and magnesium are well-known in the art. Non-limiting examples of such minerals include zinc, iron, selenium, iodine, and fluoride. Preferably, wherein an additional mineral is utilized, the mineral is selected from zinc and iron. Minerals may be, for example, salts, chelated, complexed, solubilized, or in colloidal form.

As used herein, "zinc" is inclusive of any compound containing zinc, including a salt, complex, or other form of zinc, including elemental zinc. Acceptable forms of zinc are well-known in the art. The zinc which can be used in the present invention can be in any of the commonly used forms such as, e.g., zinc lactate, zinc sulfate, zinc chloride, zinc acetate, zinc gluconate, zinc ascorbate, zinc citrate, zinc aspartate, zinc picolinate, amino acid chelated zinc, and zinc oxide. Zinc gluconate and amino acid chelated zinc are particularly preferred. Additionally, it has been found that amino acid chelated zinc is most highly preferred, as this zinc form provides optimized bioavailability of the zinc. Zinc oxide is also particularly preferred.

Amino acid chelates of zinc are well-known in the art, and are described in, for example, Pedersen et al., U.S. Pat. No. 5,516,925, assigned to Albion International, Inc., issued May 14, 1996; Ashmead, U.S. Pat. No. 5,292,729, assigned to Albion International, Inc., issued Mar. 8, 1994; and Ashmead, U.S. Pat. No. 4,830,716, assigned to Albion International, Inc., issued May 16, 1989. These chelates contain one or more natural amino acids selected from alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine or dipeptides, tripeptides or quadrapeptides formed by any combination of these amino acids.

Additionally, encapsulated zinc is also preferred for use herein.

As used herein, the USRDI for zinc is 15 milligrams. Zinc fortified compositions of the present invention typically contain at least about 0.5 milligrams of zinc, more preferably from about 1 milligram to about 7 milligrams, even more preferably from about 1 milligram to about 6 milligrams, and most preferably from about 1 milligram to about 5 milligrams of zinc, all per reference serving of the composition. As used herein, recitations of mass of zinc in any given composition refers to the mass or weight percent of the zinc-containing component (for example, the amino acid chelated zinc component), rather than the mass of elemental zinc which is part of the zinc-containing component. Of course, wherein elemental zinc is utilized as the zinc, the mass or weight percent of zinc in any given composition refers to that of the elemental zinc.

As used herein, "iron" is inclusive of any compound containing iron, including a salt, complex, or other form of iron, including elemental iron. Acceptable forms of iron are well-known in the art.

Non-limiting examples of ferrous iron sources which can be used in the present invention include ferrous sulfate, ferrous fumarate, ferrous succinate, ferrous gluconate, ferrous lactate, ferrous tartrate, ferrous citrate, ferrous amino acid chelates, and ferrous pyrophsophate, as well as mixtures of these ferrous salts. While ferrous iron is typically more bioavailable, certain ferric salts can also provide highly bioavailable sources of iron. Non-limiting examples of ferric iron sources that can be used in the present invention are ferric saccharate, ferric ammonium citrate, ferric citrate, ferric sulfate, ferric chloride, and ferric pyrophosphate, as well as mixtures of these ferric salts. A particularly preferred ferric iron source is ferric pyrophosphate, for example, microencapsulated SUNACTIVE Iron (for example, SUNACTIVE Fe 12 Superdispersion (preferred) and SUNACTIVE P80 Powder, commercially available from Taiyo International, Inc., Edina, Minn., U.S.A and Yokkaichi, Mie, Japan. SUNACTIVE Iron is particularly preferred for use herein due to its water-dispersibility, particle size, compatibility, and bioavailability.

Ferrous amino acid chelates particularly suitable as highly bioavailable amino acid chelated irons for use in the present invention are those having a ligand to metal ratio of at least 2:1. For example, suitable ferrous amino acid chelates having a ligand to metal mole ratio of two are those of formula:

$$Fe(L)_2$$

where L is an alpha amino acid, dipeptide, tripeptide or quadrapeptide reacting ligand. Thus, L can be any reacting ligand that is a naturally occurring alpha amino acid selected from alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine and valine or dipeptides, tripeptides or quadrapeptides formed by any combination of these amino acids. See e.g., Pedersen et al., U.S. Pat. No. 5,516,925, assigned to Albion International, Inc., issued May 14, 1996; Ashmead, U.S. Pat. No. 5,292,729, assigned to Albion International, Inc., issued Mar. 8, 1994; and Ashmead, U.S. Pat. No. 4,830,716, assigned to Albion International, Inc., issued May 16, 1989. Particularly preferred ferrous amino acid chelates are those where the reacting ligands are glycine, lysine, and leucine. Most preferred is the ferrous amino acid chelate sold under the trade name FERROCHEL having the reacting ligand as glycine. FERROCHEL is commercially available from Albion Laboratories, Salt Lake City, Utah.

In addition to these highly bioavailable ferrous and ferric salts, other sources of bioavailable iron can be included in the compositions of the present invention. Other sources of iron particularly suitable for fortifying compositions herein certain iron-sugar-carboxylate complexes. In these iron-sugar-carboxylate complexes, the carboxylate provides the counterion for the ferrous (preferred) or ferric iron. The overall synthesis of these iron-sugar-carboxylate complexes involves the formation of a calcium-sugar moiety in aqueous media (for example, by reacting calcium hydroxide with a sugar, reacting the iron source (such as ferrous ammonium sulfate) with the calcium-sugar moiety in aqueous media to provide an iron-sugar moiety, and neutralizing the reaction system with a carboxylic acid (the "carboxylate counterion") to provide the desired iron-sugar-carboxylate complex). Sugars that can be used to prepare the calcium-sugar moiety include any of the ingestible saccharidic materials, and mixtures thereof, such as glucose, sucrose and fructose, mannose, galactose, lactose, maltose, and the like, with sucrose and fructose being the more preferred. The carboxylic acid providing the "carboxylate counterion" can be any ingestible carboxylic acid such as citric acid, malic acid, tartaric acid, lactic acid, succinic acid, and propionic acid, as well as mixtures of these acids.

These iron-sugar-carboxylate complexes can be prepared in the manner described in Nakel et al., U.S. Pat. No. 4,786,510 and 4,786,518, issued Nov. 22, 1988. These materials are referred to as "complexes", but they may, in fact, exist in solution as complicated, highly hydrated, protected colloids; the term "complex" is used for the purpose of simplicity.

Additionally, encapsulated iron is also preferred for use herein. For example, ferrous sulfate encapsulated in a hydrogenated soybean oil matrix may be used, for example, CAP-SHURE which is commercially available from Bachem Corp., Slate Hill, N.Y. Other solid fats can be used to encapsulate the iron, such as, tristearin, hydrogenated corn oil, cottonseed oil, sunflower oil, tallow, and lard. A particularly preferred encapsulated iron source is microencapsulated SUNACTIVE Iron, commercially available from Taiyo International, Inc., Edina, Minn., U.S.A. SUNACTIVE Iron is particularly preferred for use herein due to its water-dispersibility and bioavailability.

As used herein, the USRDI for iron is 18 milligrams. Iron fortified compositions of the present invention preferably contain at least about 0.5 milligrams of iron, more preferably from about 0.5 to about 10 milligrams of iron, even more preferably from about 2 to about 7 milligrams of iron, and most preferably from about 3 milligrams to about 6 milligrams of iron, all per reference serving of the composition. As used herein, recitations of mass in any given composition refers to the mass of the iron-containing component (for example, the amino acid chelated iron component), rather than the mass or weight percent of the elemental iron which is part of the iron-containing component. Of course, wherein elemental iron is utilized as the "iron", the mass of iron in any given composition refers to that of the elemental iron.

As used herein, "selenium" is inclusive of any compound containing selenium, including a salt, complex, or other form of selenium, including elemental selenium. Selenium is useful for immune function. Acceptable forms of selenium are well-known in the art.

Selenomethionine is the principal form of selenium found in foods. Also preferred for inclusion herein are elemental selenium and/or selenium yeast.

Typically, wherein selenium is utilized herein, at least about 10 micrograms of selenium is included, per reference serving of the composition. More preferably, when used, at least about 15 micrograms of selenium is included, per reference serving of the composition. Most preferably, when used, at least about 20 micrograms of selenium is included, per reference serving of the composition. From about 10 to about 70 micrograms of selenium, per reference serving of the composition, is recommended for adult humans. As used herein, recitations of mass of "selenium" in any given composition refers to the mass of the selenium-containing component (for example, selenomethionine), rather than the mass of the elemental selenium which is part of the selenium-containing component. Of course, wherein elemental selenium is utilized as the "selenium", the mass of selenium in any given composition refers to that of the elemental selenium.

As used herein, "iodine" is inclusive of any compound containing iodine, including a salt, complex, or other form of iodine, including elemental iodine. Acceptable forms of iodine are well-known in the art. Non-limiting examples of iodine forms include potassium iodide, sodium iodide, potassium iodate, and sodium iodate.

As used herein, the USRDI for iodine is 150 micrograms. Typically, wherein iodine is utilized herein, at least about 5 micrograms of iodine is included, per reference serving of the composition. More preferably, when used, at least about 10 micrograms of iodine is included, per reference serving of the composition. Most preferably, when used, the compositions comprise from about 10 micrograms to about 50 micrograms of iodine, per reference serving of the composition. As used herein, recitations of mass or weight percent of "iodine" in any given composition refers to the mass of the iodine-containing component (for example, potassium iodide), rather than the mass of the elemental iodine which is part of the iodine-containing component. Of course, wherein elemental iodine is utilized as the "iodine", the mass of iodine in any given composition refers to that of the elemental iodine.

As used herein, "fluorine" is inclusive of any compound containing fluorine, including a salt, complex, or other form of fluorine, including elemental fluorine. Acceptable forms of fluorine are well-known in the art. Non-limiting examples of fluorine forms include sodium fluoride, stannous fluoride, and sodium monofluorophosphate.

Typically, wherein fluorine is utilized herein, at least about 0.001 milligrams of fluorine is included, per reference serving of the composition. More preferably, when used, at least about 0.01 milligrams of fluorine is included, per reference serving of the composition. Most preferably, when used, at least about 0.03 milligrams of fluorine is included, per reference serving of the composition. As used herein, recitations of mass of "fluorine" in any given composition refers to the mass of the fluorine-containing component (for example, sodium fluoride), rather than the mass of the elemental fluorine which is part of the fluorine-containing component. Of course, wherein elemental fluorine is utilized as the "fluorine", the mass of fluorine in any given composition refers to that of the elemental fluorine.

Emulsions

Dilute juice beverages of the present invention may optionally, but preferably, comprise from about 0.2% to about 5%, preferably from about 0.5% to about 3%, and most preferably from about 0.8% to about 2%, of a beverage emulsion. This beverage emulsion can be either a cloud emulsion or a flavor emulsion. Emulsions are described in, for example, U.S. Pat. No. 5,616,358, Taylor et al., assigned to The Procter & Gamble Co., issued Apr. 1, 1997 and U.S. Pat. No. 5,624,698, Dake et al., assigned to The Procter & Gamble Co., issued Apr. 29, 1997.

For cloud emulsions, the clouding agent can comprise one or more fats or oils stabilized as an oil-in-water emulsion using a suitable food grade emulsifier. Any of a variety of fats or oils may be employed as the clouding agent, provided that the fat or oil is suitable for use in foods and/or beverages. Preferred are those fats and oils that have been refined, bleached and deodorized to remove off-flavors. Especially suitable for use as clouding agents are those fats that are organoleptically neutral. These include fats from the following sources: vegetable fats such as soybean, corn, safflower, sunflower, cottonseed, canola, and rapeseed; nut fats such as coconut, palm, and palm kernel; and synthetic fats. See e.g., Kupper et al., U.S. Pat. No. 4,705,691, issued Nov. 10, 1987, for suitable fat or oil clouding agents.

Any suitable food grade emulsifier can be used that can stabilize the fat or oil clouding agent as an oil-in-water emulsion. Suitable emulsifiers include gum acacia, modified food starches (e.g., alkenylsuccinate modified food starches), anionic polymers derived from cellulose (e.g., carboxymethylcellulose), gum ghatti, modified gum ghatti, xanthan gum, tragacanth gum, guar gum, locust bean gum, pectin, and mixtures thereof. See e.g., Kupper et al., U.S. Pat. No. 4,705,691, issued Nov. 10, 1987. Modified starches treated to contain hydrophobic as well as hydrophilic groups, such as those described in Caldwell et al., U.S. Pat. 2,661,349, are preferred emulsifiers for use as herein. Octenyl succinate (OCS) modified starches such as those described in Marotta et al., U.S. Pat. No. 3,455,838 and Bamdt et al., U.S. Pat. No. 4,460,617 are especially preferred emulsifiers.

The clouding agent can be combined with a weighting agent to provide a beverage opacifier that imparts a total or partial opaque effect to the beverage without separating out and rising to the top. The beverage opacifier provides the appearance to the consumer of a juice-containing beverage. Any suitable weighting oil can be employed in the beverage opacifier. Typical weighting oils include brominated vegetable oil, glycerol ester of wood rosin (ester gum), sucrose acetate isobutyrate (SAIB) and other sucrose esters, gum damar, colophony, gum elemi, or others known to those skilled in the art. Other suitable weighting agents include brominated liquid polyol polyesters which are nondigestible. See e.g., Brand et al., U.S. Pat. No. 4,705,690, issued Nov. 10, 1987.

The cloud/opacifier emulsion is prepared by mixing the clouding agent with the weighting agent (for opacifier emulsions), the emulsifier and water. The emulsion typically contains from about 0.1% to about 25% clouding agent, from about 1% to about 20% weighting oil agent (in the case of opacifier emulsions), from about 1% to about 30% emulsifiers, and from about 25% to about 97.9% water (or quantum satis).

The particle size of the water-insoluble components of the emulsion is reduced by employing a suitable apparatus known in the art. Because the ability of emulsifying agents to hold oil in suspension is proportional to particle size, emulsions of particles with diameters of about 0.1 to about 3.0 microns are suitable. Preferably, the particles are about 2.0 microns or less in diameter. Most preferred is an emulsion in which substantially all the particles are 1.0 microns or less in diameter. The particle size is reduced by passing the mixture through an homogenizer, colloid mill or turbine-type agitator. Usually one or two passes is sufficient. See e.g., Kupper et al., U.S. Pat. No. 4,705,691, issued Nov. 10, 1987.

Flavor emulsions useful in beverage products of the present invention comprise one or more suitable flavor oils, extracts, oleoresins, essential oils and the like, known in the art for use as flavorants in beverages. This component can also comprise flavor concentrates such as those derived from concentration of natural products such as fruits. Terpeneless citrus oils and essences can also be used herein. Examples of suitable flavors include, for example, fruit flavors such as orange, lemon, lime and the like, cola flavors, tea flavors, coffee flavors, chocolate flavors, dairy flavors. These flavors can be derived from natural sources such as essential oils and extracts, or can be synthetically prepared. The flavor emulsion typically comprises a blend of various flavors and can be employed in the form of an emulsion, alcoholic extract, or spray dried. The flavor emulsion can also include clouding agents, with or without weighting agents, as previously described. See e.g., Kupper et al., U.S. Pat. No. 4,705,691, issued Nov. 10, 1987.

Flavor emulsions are typically prepared in the same manner as cloud/opacifier emulsions by mixing one or more flavoring oils (from about 0.001% to about 20%) with an emulsifying agent (from about 1% to about 30%) and water. (The oil clouding agents can also be present). Emulsions of particles with diameters of from about 0.1 to about 3.0 microns are suitable. Preferably, the particles are about 2.0 microns or less in diameter. Most preferably, the particles are about 1.0 microns or less in diameter. The emulsifying agent coats the particularized flavor oil to aid in preventing coalescence and in maintaining an appropriate dispersion. The viscosity and specific gravity of the flavor emulsion are regulated to be compatible with the finished beverage. See e.g., Kupper et al., U.S. Pat. No. 4,705,691, issued Nov. 10, 1987.

Thickeners

One or more thickeners may be optionally added to the present compositions to, for example, provide control of viscosity and/or texture. Various thickeners are well-known in the art. Non-limiting examples of thickeners include cellulose compounds, gum ghatti, modified gum ghatti, xanthan gum, tragacanth gum, guar gum, gellan gum, locust bean gum, pectin, and mixtures thereof. See e.g., Kupper et al., U.S. Pat. No. 4,705,691, issued Nov. 10, 1987. Particularly preferred for use herein include xanthan gum, gellan gum, guar gum, and cellulose compounds.

Cellulose compounds are widely known in the art. Cellulose compounds are typically anionic polymers derived from cellulose. Non-limiting examples of cellulose compounds utilized herein include carboxymethylcellulose, methylcellulose, and hydroxyethylcellulose, hydroxypropylcellulose. The most preferred cellulose compound for use in the present compositions is carboxymethylcellulose, particularly sodium carboxymethylcellulose. Non-limiting examples of cellulose compounds include sodium carboxymethylcellulose (commercially available as Aqualon® 7HOF from Hercules, Inc., Wilmington, Del.

When present, the thickener is typically utilized in the present compositions at levels preferably from about 0.00001% to about 10%, more preferably from about 0.00001% to about 5%, still more preferably from about 0.00001% to about 1%, even more preferably from about 0.01% to about 0.2%, and most preferably from about 0.02% to about 0.05%, by weight of the composition.

Flavoring Agents

One or more flavoring agents are recommended for the embodiments of the present invention in order to enhance their palatability. Any natural or synthetic flavor agent can be used in the present invention. For example, it is highly preferred to include fruit juice in the present compositions. It is also a preferred embodiment to include one or more botanical and/or fruit flavors may be utilized herein. Thus, the flavor agent can also comprise a blend of various flavors. As used herein, such flavors may be synthetic or natural flavors.

Any of a variety of fruit juices and or fruit juice concentrates may be incorporated herein including, for example, apple, strawberry, lemon, grapefruit, kiwi, lime, grape, tangerine, orange, cherry, raspberry, cranberry, peach, watermelon, passion fruit, pineapple, mango, cupuacu, guava, cocoa, papaya, and apricot fruit juices, as well as mixtures thereof, may be used. In a particularly preferred embodiment, the present compositions comprise greater than 0%, more preferably at least about 5%, still more preferably from about 5% to about 60%, even more preferably from about 5% to about 40%, and most preferably from about 5% to about 30% fruit juice, all by weight of the composition.

Fruit flavors may also be used. Particularly preferred fruit flavors are apple, strawberry, lemon, grapefruit, kiwi, lime, grape, tangerine, orange, cherry, raspberry, cranberry, peach, watermelon, and the like, as well as mixtures thereof. Blends of flavors (for example, tangerine-orange) are most preferred. Exotic and lactonic flavors such as, for example, passion fruit, pineapple, mango, cupuacu, guava, cocoa, papaya, and apricot, as well as mixtures thereof, may also be utilized. These fruit flavors can be derived from natural sources such as fruit juices and flavor oils, or may alternatively be synthetically prepared.

Preferred botanical flavors include, for example, tea (preferably black and green tea, most preferably green tea), aloe vera, guarana, ginseng, ginkgo, hawthorn, hibiscus, rose hips, chamomile, peppermint, fennel, ginger, licorice, lotus seed, schizandra, saw palmetto, sarsaparilla, safflower, St. John's Wort, curcuma, cardimom, nutmeg, cassia bark, buchu, cinnamon, jasmine, haw, chrysanthemum, water chestnut, sugar cane, lychee, bamboo shoots, vanilla, coffee, and the like. Preferred among these is tea, guarana, ginseng, ginko, and coffee. In particular, the combination of tea flavors, preferably green tea or black tea flavors (preferably green tea), optionally together with fruit flavors has an appealing taste. In another preferred embodiment, coffee is included within the present compositions. A combination of green tea and coffee in the present compositions is often preferred.

If desired, the flavor in the flavoring agent may be formed into emulsion droplets which are then dispersed in the beverage composition or concentrate. Because these droplets usually have a specific gravity less than that of water and would therefore form a separate phase, weighting agents (which can also act as clouding agents) can be used to keep the emulsion droplets dispersed in the beverage composition or concentrate. Examples of such weighting agents are brominated vegetable oils (BVO) and resin esters, in particular the ester gums. See L. F. Green, Developments in Soft Drinks Technology, Vol. 1, Applied Science Publishers Ltd., pp. 87–93 (1978) for a further description of the use of weighting and clouding agents in liquid beverages. Typically the flavoring agents are conventionally available as concentrates or extracts or in the form of synthetically produced flavoring esters, alcohols, aldehydes, terpenes, sesquiterpenes, and the like.

Coloring Agent

Small amounts of one or more coloring agents may be utilized in the compositions of the present invention. FD&C dyes (e.g., yellow #5, blue #2, red #40) and/or FD&C lakes are preferably used. By adding the lakes to the other powdered ingredients, all the particles, in particular the colored iron compound, are completely and uniformly colored and a uniformly colored beverage mix is attained. Preferred lake dyes which may be used in the present invention are the FDA-approved Lake, such as Lake red #40, yellow #6, blue #1, and the like. Additionally, a mixture of FD&C dyes or a FD&C lake dye in combination with other conventional food and food colorants may be used. Riboflavin and Scarotene may also be used. Additionally, other natural coloring agents may be utilized including, for example, fruit, vegetable, and/or plant extracts such as grape, black currant, aronia, carrot, beetroot, red cabbage, and hibiscus.

The amount of coloring agent used will vary, depending on the agents used and the intensity desired in the finished product. The amount can be readily determined by one skilled in the art. Generally, if utilized, the coloring agent should be present at a level of from about 0.0001% to about 0.5%, preferably from about 0.001% to about 0.1%, and most preferably from about 0.004% to about 0.1%, by weight of the composition.

Preservatives

Preservatives may or may not be needed for use in the present compositions. Techniques such as aseptic and/or clean-fill processing may be utilized to avoid preservatives.

One or more preservatives may, however, optionally be added to the present compositions. Preferred preservatives include, for example, sorbate, benzoate, and polyphosphate preservatives (for example, sodium hexametapolyphosphate).

Preferably, wherein a preservative is utilized herein, one or more sorbate or benzoate preservatives (or mixtures thereof) are utilized. Sorbate and benzoate preservatives suitable for use in the present invention include sorbic acid, benzoic acid, and salts thereof, including (but not limited to) calcium sorbate, sodium sorbate, potassium sorbate, calcium benzoate, sodium benzoate, potassium benzoate, and mixtures thereof. Sorbate preservatives are particularly preferred. Potassium sorbate is particularly preferred for use in the present invention.

Wherein a composition comprises a preservative, the preservative is preferably included at levels from about 0.0005% to about 0.5%, more preferably from about 0.001% to about 0.4% of the preservative, still more preferably from about 0.001% to about 0.1%, even more preferably from about 0.001% to about 0.05%, and most preferably from about 0.003% to about 0.03% of the preservative, by weight of the composition. Wherein the composition comprises a mixture of one or more preservatives, the total concentration of such preservatives is preferably maintained within these ranges.

Acidulants

If desired, the present compositions may optionally comprise one or more acidulants. An amount of an acidulant may be used to maintain the pH of the composition. Compositions of the present invention preferably have a pH of from about 2 to about 7, more preferably from about 2.5 to about 7, and most preferably from about 3.5 to about 4.5. Beverage acidity can be adjusted to and maintained within the requisite range by known and conventional methods, e.g., the use of one or more of the aforementioned acidulants. Typically, acidity within the above recited ranges is a balance between maximum acidity for microbial inhibition and optimum acidity for the desired beverage flavor.

Organic as well as inorganic edible acids may be used to adjust the pH of the beverage, and may be added additional to the acid serving as part of the second component herein. The acids can be present in their undissociated form or, alternatively, as their respective salts, for example, potassium or sodium hydrogen phosphate, potassium or sodium dihydrogen phosphate salts. The preferred acids are edible organic acids which include citric acid, malic acid, fumaric acid, adipic acid, phosphoric acid, gluconic acid, tartaric acid, ascorbic acid, acetic acid, phosphoric acid or mixtures thereof. The most preferred acids are citric and malic acids.

The acidulant can also serve as an antioxidant to stabilize beverage components. Examples of commonly used antioxidant include but are not limited to ascorbic acid, EDTA (ethylenediaminetetraacetic acid), and salts thereof.

Water

Water is not necessary for dry beverage compositions (as used herein, "dry beverage compositions" are substantially dry (meaning, comprising from 0% to about 4%, preferably from 0% to about 3% water) compositions which are suitable for dilution with water or other liquids to form a concentrated or ready-to-drink beverage composition). Dry beverage compositions will typically be diluted with water or another liquid prior to consumption.

Therefore, the present beverage compositions may comprise from 0% to about 99.999% water, by weight of the composition. Beverage compositions which are not "dry beverage compositions" typically comprise at least about 4% water, preferably at least about 20% water, more preferably at least about 40% water, still more preferably at least about 50% water, even more preferably at least about 75% water, and most preferably at least about 80% water. Such beverage composition are typically beverage concentrates or ready-to-drink beverage compositions. Still further, ready-to-drink beverage compositions will typically comprise at least about 50% water, more preferably at least about 70% water. As used herein, the water of the composition includes all added water and any water present in combination components, for example, fruit juice.

Carbonation Component

Carbon dioxide can be introduced into the water which is mixed with a beverage concentrate or into a beverage composition after dilution to achieve carbonation. The carbonated beverage can be placed into a container, such as a bottle or can, and then sealed. Any conventional carbonation methodology may be utilized to make carbonated beverage compositions of this invention. The amount of carbon dioxide introduced into the beverage will depend upon the particular flavor system utilized and the amount of carbonation desired.

Method of Making

The compositions of the present invention are prepared by means which are well-known to one of ordinary skill in the art. For example, the compositions of the present invention may be prepared by dissolving, dispersing or otherwise mixing all components singularly or in suitable combinations together, and in water where appropriate, agitating with a mechanical stirrer until all of the components have been solubilized or adequately dispersed or mixed. Where appropriate, all separate solutions and dispersions may then be combined.

Various of the calcium and magnesium forms may require conversion to the solubilized species to allow for dissolution. Methods for making calcium containing beverages, for example, are described in Nakel et al., U.S. Pat. No. 4,737,375, Braun et al., U.S. Pat. No 4,830,862, and Heckert et al., U.S. Pat. No. 4,722,847, which are herein incorporated by reference.

In making a ready-to-drink beverage composition, a beverage concentrate may be optionally be formed first. Fruit juice beverage concentrates typically comprise fruit concentrates, color dyes, vitamins, preservatives (if desired), and flavorings. The concentrates are then mixed with water, sweeteners, and other beverage ingredients to form a finished ready-to-drink beverage.

Ready-to-drink beverage compositions and beverage concentrates may require a unit operation which will produce microbial inactivation/reduction for safe production of marketable, high quality aseptic (shelf-stable) and refrigerated extended shelf-life products before product packaging. Shelf-stable beverages include products that achieve commercial sterility yielding 3 to 12 (or more) month shelf stability at room temperature, ie., with no refrigeration. Wherein a shelf-stable composition is desired, the final mixture can optionally, and preferably, be pasteurized or filled aseptically using appropriate, well-known process conditions. Extended shelf life products refer to products that have been pasteurized which require refrigeration to deliver 2 to 12 weeks stability.

Various microbial inactivation/reduction methods may be utilized, including for example: thermal processing, ultraviolet ray (UV) treatment, ultra-high pressure, pulsed electric fields, and filter sterilization. Thermal processing is a preferred commercially accepted method for pasteurized and aseptic (ultra-high-temperature processing). Pasteurization involves heating (indirect or direct) the beverage composition (from about 71° C. to about 95° C.), holding for about 10 seconds to about 20 seconds, and cooling. Aseptic processing of acid beverages requires heating (from about 95° C. to about 130° C.), holding for about 2 seconds to about 15 seconds, and cooling. Product heating/cooling is delivered using heat exchangers. Another option is "hot fill" in which the hot product helps to achieve sterility. The heating can also be achieved using Ohmic Heating, Direct Steam Injection, Steam Infusion, or Microwaves to reach the hold tube temperature. The following are emerging technologies: UV, Ultra-High Pressure, Pulsed Electric Fields, and Ohmic Heating.

EXAMPLES

The following are non-limiting examples of compositions used in accordance with the present invention. The compositions are prepared utilizing conventional methods, for example in accordance with the procedures described above. The following examples are provided to illustrate the invention and are not intended to limit the spirit or scope thereof in any manner.

Example 1

A bulk, shelf-stable fruit punch flavored beverage composition, which is ready-to-drink, is prepared containing the following components in the indicated amounts:

| Component | Amount (grams) |
| --- | --- |
| High Fructose Corn Syrup-55 | 114 |
| Sucrose | 18 |
| Flavorings | 0.7 |
| Colorants | 0.08 |
| Malic Acid | 3.4 |
| Citric Acid | 6.3 |
| Ascorbic Acid | 0.7 |
| Pyroxidine Hydrochloride (Vitamin $B_6$) | 0.0027 |
| Calcium Carbonate | 3.1 |
| Magnesium Oxide | 0.6 |
| Zinc Oxide | 0.02 |
| Fruit Juice Concentrate | 37 |
| Water | 815 |

Each reference serving (i.e., 250 milliliters) of the beverage composition contains about: 283% of the USRDI for vitamin C; 30% of the USRDI for vitamin $B_6$; 35% of the USRDI for calcium; 24% of the USRDI for magnesium; and 28% of the USRDI for zinc. Some loss of nutrient may occur during storage.

Example 2

A bulk, chilled orange flavored beverage composition, which is ready-to-drink, is prepared containing the following components in the indicated amounts:

| Component | Amount (grams) |
| --- | --- |
| High Fructose Corn Syrup-55 | 101.5 |
| Sucrose | 18 |
| Flavorings | 1.5 |
| Colorants | 0.08 |
| Thickeners | 0.6 |
| Opacifier (Emulsion) | 10.3 |
| Malic Acid | 2.7 |
| Citric Acid | 6.0 |
| Ascorbic Acid | 0.6 |
| Pyridoxine Hydrochloride (Vitamin $B_6$) | 0.002 |
| Cyanocobalamin (Vitamin $B_{12}$) | 0.004 |
| Calcium Carbonate | 3.3 |
| Magnesium Oxide | 0.35 |
| Zinc Oxide | 0.01 |
| Fruit Juice Concentrate | 36 |
| Water | 807 |

Each reference serving (ie., 250 milliliters) of the beverage composition contains about: 287% of the USRDI for vitamin C; 19% of the USRDI for vitamin $B_6$; 18.2% of the USRDI for vitamin $B_{12}$; 35% of the USRDI for calcium; 14% of the USRDI for magnesium; and 14% of the USRDI for zinc. Some loss of nutrient may occur during storage.

Example 3

A bulk beverage composition (having no added sugar other than from juice concentrates), which is ready-to-drink, is prepared containing the following components in the indicated amounts:

| Component | Amount (grams) |
| --- | --- |
| Aspartame | 0.22 |
| Acesulfame K | 0.18 |
| Flavorings | 1.5 |
| Colorants | 0.032 |
| Titanium Dioxide (Opacifier) | 0.1 |
| Thickeners | 0.6 |
| Preservatives | 0.5 |
| Malic Acid | 3.0 |
| Citric Acid | 5.4 |
| Ascorbic Acid | 0.64 |
| FERROCHEL (Bis-glycinate amino acid chelate, commercially available from Albion Labs, Salt Lake City, Utah) | 0.067 |
| Calcium Carbonate | 3.1 |
| Magnesium Carbonate | 0.75 |
| Zinc Oxide | 0.017 |
| Fruit Juice Concentrate | 36 |
| Water | 947 |

Each reference serving (ie., 250 milliliters) of the beverage composition contains about: 20% of the USRDI for iron.

What is claimed is:

1. A beverage composition comprising:
   (a) a calcium source comprising at least about 50 milligrams of the calcium source per reference serving of the composition and in a form selected from the group consisting of calcium carbonate, solubilized species thereof, and mixtures thereof;
   (b) at least about 20 milligrams of a magnesium source per reference serving of the composition;
   (c) at least about 0.5 milligrams of zinc per reference serving of the composition;
   (d) from about 48 milligrams to about 170 milligrams of vitamin C per reference serving of the composition;

(e) a beverage component selected from the group consisting of water, fruit juice, tea solids, fruit flavors, botanical flavors, and mixtures thereof; and wherein the composition is substantially free of milk base solids and further comprising at least one nutrient selected from the group consisting of vitamin A, vitamin E, vitamin B6, vitamin B12, iron, and mixtures thereof.

2. A beverage composition according to claim 1 comprising from about 100 milligrams to about 1100 milligrams of the calcium source per reference serving of the composition and from about 40 milligrams to about 300 milligrams of the magnesium source per reference serving of the composition.

3. A beverage composition according to claim 1 wherein the magnesium source comprises a form selected from the group consisting of magnesium carbonate, magnesium oxide, magnesium hydroxide, magnesium citrate, solubilized species thereof, and mixtures thereof.

4. A beverage composition according to claim 1 comprising from about 150 milligrams to about 600 milligrams of the calcium source per reference serving of the composition and from about 40 milligrams to about 250 milligrams of the magnesium source per reference serving of the composition.

5. A beverage composition according to claim 1 wherein the magnesium source comprises a form selected from the group consisting of magnesium carbonate, magnesium oxide, magnesium citrate, solubilized species thereof, and mixtures thereof; and wherein the beverage component is selected from the group consisting of water, fruit juice, fruit flavors, and mixtures thereof.

6. A beverage composition according to claim 1 comprising from about 200 milligrams to about 500 milligrams of the calcium source per reference serving of the composition and from about 40 milligrams to about 150 milligrams of the magnesium source per reference serving of the composition.

7. A beverage composition according to claim 1 wherein the magnesium source comprises a form selected from the group consisting of magnesium carbonate, magnesium oxide, solubilized species thereof, and mixtures thereof.

8. A beverage composition according to claim 1 comprising at least about 20% water, by weight of the composition.

9. A beverage composition according to claim 1 wherein the zinc is zinc oxide.

10. A beverage composition according to claim 1 further comprising iron, wherein the iron is selected from the group consisting of microencapsulated ferric pyrophosphate and amino acid chelated iron.

11. A beverage composition according to claim 1 wherein at least one of the nutrients is selected from the group consisting of vitamin B6 and vitamin B12.

12. A beverage composition according to claim 1 which is a ready-to-drink beverage composition comprising at least about 70% water, by weight of the composition.

13. A beverage composition according to claim 12 comprising from about 240 milligrams to about 400 milligrams of the calcium source per reference serving of the composition and from about 40 milligrams to about 150 milligrams of the magnesium source per reference serving of the composition.

* * * * *